(12) United States Patent
Cao et al.

(10) Patent No.: US 9,858,955 B1
(45) Date of Patent: Jan. 2, 2018

(54) DISTURBANCE COMPENSATION FOR DUAL-STAGE SERVO SYSTEM USING VIBRATION SENSOR

(71) Applicant: Seagate Technology LLC, Cupertino, CA (US)

(72) Inventors: WenJun Cao, Singapore (SG); GuoQing Zhang, Singapore (SG); Xiang Lu, Singapore (SG); Qiang Bi, Singapore (SG); MingZhong Ding, Singapore (SG); Lou Supino, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/231,513

(22) Filed: Aug. 8, 2016

(51) Int. Cl.
   *G11B 5/09* (2006.01)
   *G11B 5/55* (2006.01)
(52) U.S. Cl.
   CPC .......... *G11B 5/5565* (2013.01); *G11B 5/5526* (2013.01); *G11B 5/5552* (2013.01)
(58) Field of Classification Search
   None
   See application file for complete search history.

(56) References Cited

U.S. PATENT DOCUMENTS

| | | | |
|---|---|---|---|
| 4,947,093 A | 8/1990 | Dunstan et al. | |
| 5,920,441 A * | 7/1999 | Cunningham | G11B 5/5552 360/78.03 |
| 6,285,522 B1 | 9/2001 | McKenzie et al. | |
| 6,493,172 B1 * | 12/2002 | Morris | G11B 5/5552 360/77.02 |
| 6,584,048 B1 * | 6/2003 | Tateishi | G11B 7/08511 369/30.15 |
| 6,741,417 B2 | 5/2004 | Hsin et al. | |
| 7,283,321 B1 * | 10/2007 | Sun | G11B 5/5552 360/78.05 |
| 8,049,982 B1 | 11/2011 | Grundvig et al. | |
| 8,797,673 B2 | 8/2014 | Supino | |
| 9,111,575 B1 | 8/2015 | Zhou et al. | |
| 9,202,496 B2 | 12/2015 | Supino | |
| 9,280,995 B2 | 3/2016 | Fan et al. | |
| 2003/0016607 A1 * | 1/2003 | Cho | G11B 7/0953 369/47.42 |
| 2006/0109585 A1 * | 5/2006 | Lee | G11B 5/5552 360/77.02 |
| 2009/0122439 A1 * | 5/2009 | Abramovitch | G11B 5/5582 360/77.02 |

* cited by examiner

*Primary Examiner* — Peter Vincent Agustin
(74) *Attorney, Agent, or Firm* — Faegre Baker Daniels LLP (57) ABSTRACT

An apparatus includes a microactuator controller configured to generate a microactuator control signal, a feedforward microactuator compensator configured to generate a microactuator compensation signal, and a microactuator model filter configured to filter a modified microactuator control signal. The microactuator compensation signal is configured to be injected into the microactuator control signal to generate the modified microactuator control signal. The microactuator model filter generates a filtered modified microactuator control signal and injects the filtered modified microactuator control signal into a position error signal to generate a modified position error signal.

18 Claims, 5 Drawing Sheets

DISTURBANCE COMPENSATION FOR DUAL-STAGE SERVO SYSTEM USING VIBRATION SENSOR

SUMMARY

An apparatus includes a microactuator controller configured to generate a microactuator control signal, a feedforward microactuator compensator configured to generate a microactuator compensation signal, and a microactuator model filter configured to filter a modified microactuator control signal. The microactuator compensation signal is configured to be injected into the microactuator control signal to generate the modified microactuator control signal. The microactuator model filter generates a filtered modified microactuator control signal and injects the filtered modified microactuator control signal into a position error signal to generate a modified position error signal.

A method includes positioning a voice coil motor (VCM) via a final VCM control signal. The final VCM control signal is generated in response to at least a position error signal, a filtered modified microactuator control signal, and a feedforward VCM compensation signal. The method further includes positioning a microactuator via a filtered modified microactuator control signal. The filtered modified microactuator control signal is generated in response to a position error signal and a feedforward microactuator compensation signal.

An integrated circuit includes means for controlling a position of a voice coil motor (VCM) assembly via a VCM control loop, means for controlling a position of a microactuator via a microactuator control loop, and means for decoupling components of the microactuator control loop from components of the VCM control loop.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to servo control systems, including multi-stage actuation systems, and more particularly to disturbance compensation approaches for use in servo control systems.

Figure 1:
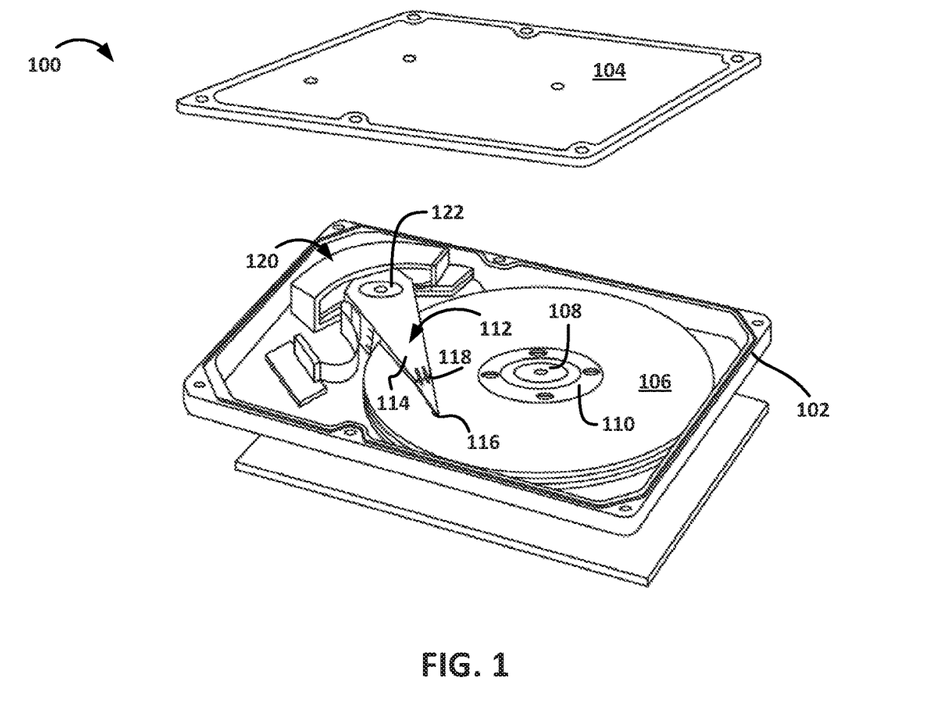
FIG. 1 shows an exploded, perspective view of a hard drive, in accordance with certain embodiments of the present disclosure.
Figure 2:
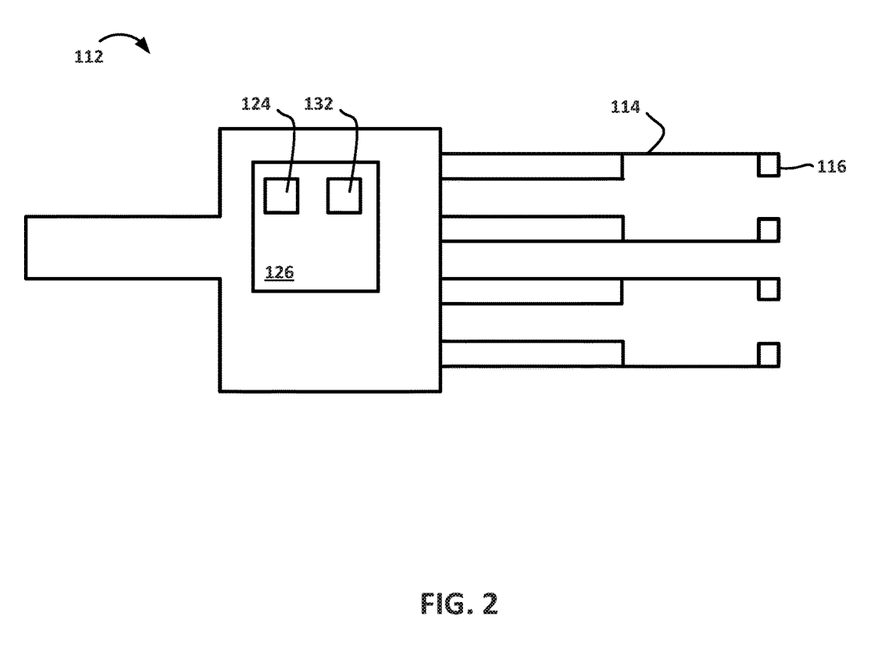
FIG. 2 shows a side view of an actuator assembly, in accordance with certain embodiments of the present disclosure.
Figure 3:
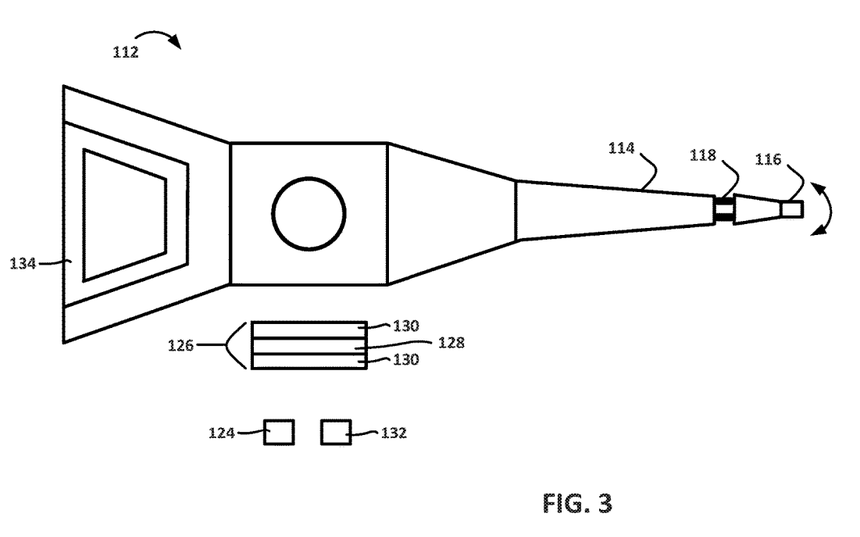
FIG. 3 shows an exploded top view of the actuator assembly of FIG. 2.

FIG. 1 shows an exploded, perspective view of a hard drive 100 having a base deck 102 and top cover 104. The hard drive 100 includes magnetic recording discs 106 coupled to a spindle motor 108 by a disc clamp 110. The hard drive 100 also includes an actuator assembly 112 coupled to a suspension 114 that positions read/write heads 116 over data tracks on the magnetic records discs 106. Each read/write head 116 can be coupled to a microactuator 118, which assists with positioning the read/write head 116 over a desired track on the magnetic recording discs 106. Each microactuator 118 can be positioned at least partially on or between the suspension 114 and one of the read/write heads 116. The read/write heads 116 may be coupled to the suspension 114 by a head-gimbal assembly (not shown). During operation, the spindle motor 108 rotates the magnetic recording discs 106 while the actuator assembly 112 is driven by a voice coil motor assembly 120 to pivot around a pivot bearing 122. The hard drive 100 further includes a servo control system—discussed in more detail below—that controls rotation of the actuator assembly 112 via the voice coil motor (VCM) assembly 120 and controls actuation of the microactuator 118 to position the read/write heads 116 over a desired track on the magnetic recording discs 106 for reading and writing operations. The actuator assembly 112 may be coupled to the pivot bearing 122 by an adhesive or a tolerance ring (not shown). FIG. 2 shows a side view of the actuator assembly 112, and FIG. 3 shows an exploded, top view of the actuator assembly 112.

During operation, hard drives may experience internal disturbances and/or be subject to external disturbances that affect hard drive performance and can cause data reading and writing errors. External disturbances involve, for example, vibration in a computer chassis which can be caused by, for example, acoustic signals generated by speakers coupled to the computer chassis. Internal disturbances can involve one or more of the read/write heads 116 contacting the magnetic recording medium 106 or a particle and inducing vibration within the actuator assembly 112. Other internal disturbances involve single wedge off-track (SWOT) events. SWOT events occur when interfaces between components of dissimilar metals become overly-stressed—causing the components to suddenly move with respect to each other. While this relieves the stress between the components, it also releases a burst of energy that induces vibrations within the actuator assembly 112, among other components. Such events are referred to as SWOT events because their intensity and unpredictability can cause the read/write heads 116 to go off-track in the time it takes the read/write heads 116 to traverse a single data wedge in between servo zones on the magnetic recording discs 106.

These disturbances may cause the actuator assembly 112 to vibrate to such an extent that the actuator assembly 112 is unable to accurately maintain a desired position over the magnetic recording discs 106. For example, the read/write heads 116 may be reading data from or writing data to a desired track on one of the magnetic recording discs 106 when the shock event occurs (e.g., a SWOT event) or while computer speakers play music. The disturbances may cause the actuator assembly 112 and the read/write heads 116 to move off the desired track (i.e., off-track). This results in writing or reading errors because the read/write heads 116 are knocked off-track—making it difficult for a positioning system (e.g., servo control system) to correct the position of the actuator assembly 112 before the read or write operation is completed. An off-track writing error may result in a hard error where the read/write heads 116 write data to an unknown track, which may overwrite already-written data. An off-track reading error may result in an operation called a read retry where the hard drive 100 attempts to re-read the desired data, which can affect performance of a computer using the hard drive 100.

To detect and compensate for the above-mentioned disturbances, hard drives can be provisioned with one or more vibration sensors. For example, FIGS. 2 and 3 show a vibration sensor 124 coupled to the actuator assembly 112. Although shown as being coupled to one side of the actuator assembly 112, the present disclosure contemplates that the vibration sensor 124 may be coupled elsewhere on the actuator assembly 112 or hard drive 100. For example, the vibration sensor 124 may be attached to the suspension 114, a voice coil shelf, or other surfaces of the actuator assembly 112 and the hard drive 100. As best seen in FIG. 3, the actuator assembly 112 features a flex circuit 126 having one or more conductive layers 128 formed of copper, for example, and sandwiched between layers of polyimide or various polymers 130 used in flexible circuits. The flex circuit 126 facilitates transmission of electrical signals to and from read/write heads and is also coupled to a preamplifier 132, as discussed in more detail below. The vibration sensor 124 is coupled to the flex circuit 126 by solder pads (not shown), which mechanically and electrically couple the vibration sensor 124 to the conductive layer 128. The vibration sensor 124 is electrically coupled to the preamplifier 132, which processes various control, power, and communication signals of the hard drive 100.

The vibration sensor 124 can be a piezoelectric-based acceleration sensor or equivalent. A piezoelectric element generates a voltage in response to an applied force or strain (i.e., piezoelectric effect), and, inversely, generates a force or strain in response to an applied voltage (i.e., inverse piezoelectric effect). For example, the vibration sensor 124 may include one or more piezo-based beams or cantilevers, which respond to acceleration (e.g., vibrations) and generate output signals indicative of the acceleration subjected to the sensor. The vibration sensor 124 may be designed to resonate at a particular bandwidth, which may be determined based on a desired level of sensitivity, response time, etc. In some embodiments, a bandwidth of interest may range from 50-400 kHtz, 70-120 kHtz, 67-113 kHtz, 20-67 kHtz, or 113-220 kHtz. The vibration sensor 124 may sense multidirectional vibration modes (e.g., horizontal, vertical) by monitoring waves generated as a result of a disturbance. In some embodiments, the hard drive 100 is provisioned with only a single vibration sensor, such as the vibration sensor 124 positioned on the actuator assembly 112—although the present disclosure is not limited to embodiments with only a single vibration sensor. A single vibration sensor 124 within the hard drive 100 on the actuator assembly 112, rather than multiple vibration sensors positioned externally to the hard drive 100, can reduce cost and complexity and allow the hard drive 100 to be made thinner.

The voice coil motor assembly 120 (including a voice coil 134 shown in FIG. 3) and microactuators 118 are arranged to carry out various positioning operations (e.g., track seeking, track settling, track following) that position the read/write heads 116 over a desired track of the magnetic recording disc 106 to read data from or write data to the desired track. For example, in response to a command to read data from or write data to a track different from where a read/write head 116 is currently positioned (i.e., a track-seeking operation), a current may be applied to the voice coil 134 of the voice coil motor assembly 124 to rotate the actuator assembly 112 (and therefore the read/write head 116) towards the desired track. As the read/write head 116 nears the desired track, the microactuator 118 may be activated to assist the voice coil motor assembly 120 with settling over the desired track (i.e., a track-settling operation). For example, the microactuator 118 can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, the read/write head 116 will pivot (as denoted with arrows in FIG. 3). Once the read/write head 116 is positioned over the desired track, the microactuator 118 may be used to compensate for small positioning errors (i.e., a track-follow operation) and/or to compensate for disturbances sensed by the vibration sensor 124. It is appreciated that the microactuator 118 may be positioned anywhere on actuator assembly 112. For example, the microactuator 128 may be positioned between the suspension 114 and the read/write head 116. In certain embodiments, the suspension 114 is separated into multiple sections and the microactuator 118 may be positioned between the multiple sections. Moreover, the actuator assembly 112 may include multiple sets of microactuators 118. For example, the hard drive 100 may utilize a dual- or triple-stage actuation system, which may refer to a number of actuation systems (e.g., voice coil motor assembly 112, microactuators 118) used by the hard drive 100 to position the read/write heads 116.

Figure 4:
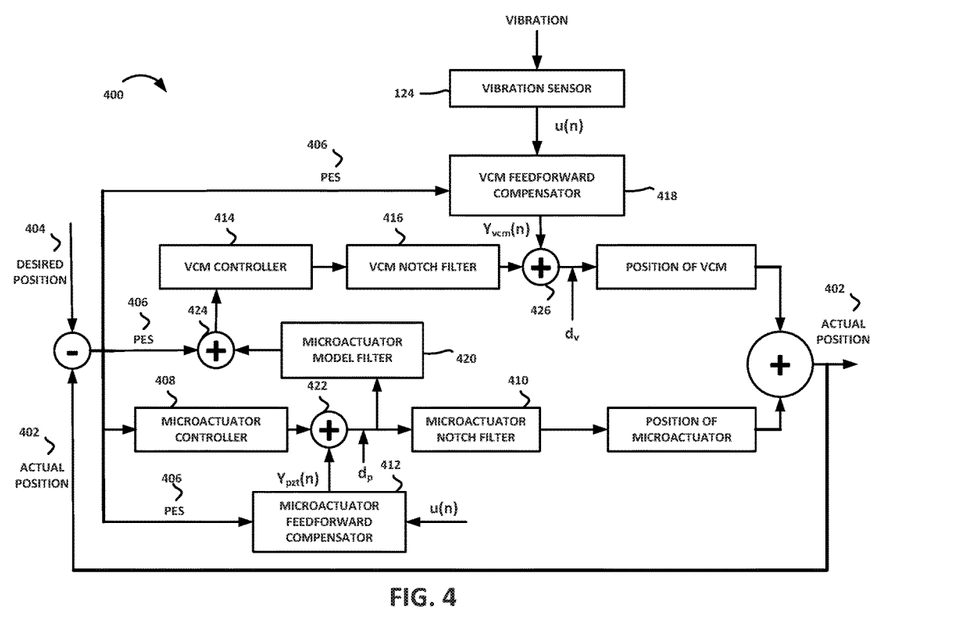
FIG. 4 shows a diagram of a servo control system, in accordance with certain embodiments of the present disclosure.

FIG. 4 provides a high-level representation of a servo control system 400. In operation, a read/write head 116 reads servo data (e.g., positioning data) embedded on a magnetic recording disc 106 to determine an actual position 402 of the read/write head 116 relative to tracks on the magnetic recording disc 106. The actual position 402 of the read/write head 116 is subtracted from a desired position 404 of the read/write head 116 to determine a position error signal (PES) 406, which is the difference between where the read/write head 116 is and should be positioned.

The servo control system 400 includes a microactuator controller 408, microactuator notch filter 410, microactuator feedforward compensator 412, VCM controller 414, VCM notch filter 416, and VCM feedforward compensator 418. The servo control system 400 of the present disclosure is designed to decouple components of the microactuator control loop from components of the voice coil motor (VCM) control loop. As will be shown by Equations 1-9 below, the servo control system 400 can be configured such that microactuator controller 408 can be designed separately from the VCM controller 414. This is useful because aspects of the servo control system 400—such as filter parameters for particular disturbances and frequencies—can be tuned for effective compensation of disturbances experienced by the actuator assembly 112 and sensed by the vibration sensor 124. In particular, the microactuator controller 408, microactuator notch filter 410, microactuator feedforward compensator 412 can be designed to compensate for higher frequency disturbance components while the VCM controller 414, VCM notch filter 416, and VCM feedforward compensator 418 can be designed to compensate for lower frequency disturbance components.

FIG. 4 is shown as having a single vibration sensor 124 that directs a disturbance signal (u(n)) to both the microactuator feedforward compensator 412 and VCM feedforward compensator 418—although the disclosure is not limited to embodiments with only a single vibration sensor.

During operation of the hard drive 100, the PES 406 is used to adjust a position of the read/write head 116 with respect to tracks on the magnetic recording disc 106 such that the read/write head 116 is positioned over the desired track. For example, the PES 406 is injected into the VCM controller 414, which generates a VCM control signal that assists with controlling current applied to the voice coil 134 for rotating the actuator assembly 112. The PES 406 is also injected into the microactuator controller 408, which generates a microactuator control signal that assists with controlling voltage applied to the microactuator 118 (e.g., PZT elements) for pivoting the read/write head 116.

VCM and microactuator compensation signals, $Y_{pzt}(n)$ and $Y_{vcm}(n)$, are generated in response to the PES 406 and vibration sensor signal(s) using the microactuator feedforward compensator 412 and VCM feedforward compensator 418, respectively. The compensation signals are applied to the respective VCM and microactuator stages of the servo control system 400 to compensate for disturbances. As shown in FIG. 4, the microactuator compensation signal, $Y_{pzt}(n)$, generated by the microactuator feedforward compensator 412 is injected at summing node 422—positioned after the microactuator controller 408 but before the microactuator notch filter 410—to generate a modified microactuator control signal. The modified microactuator control signal is filtered by the microactuator notch filter 410. The filtered modified microactuator control signal controls voltage applied to the microactuator 118 for pivoting the read/write head 116.

The modified microactuator control signal is also used by the microactuator model feedback filter 420, which can take the form of a low-order filter that represents the position of the microactuator. The microactuator model feedback filter 420 is designed to offset an estimated microactuator position from PES inputted to the VCM controller 414. The microactuator model feedback filter 420 filters the modified microactuator control signal after which the filtered modified microactuator control signal is added to from the PES 406 at junction 424 to generate a modified PES. The modified PES is modified such that the effect of the microactuator position is removed. In other words, the modified PES is the estimated residual PES after accounting for the microactuator positioning. The modified PES injected into the VCM controller 408, As such, the VCM controller 414, VCM notch filter 416, and VCM feedforward compensator 418 can be designed to focus on disturbance components better suited to be compensated for by the VCM. The VCM compensation signal, $Y_{vcm}(n)$, generated by the VCM feedforward compensator 418 is injected at summing node 426, which is positioned after both the VCM controller 414 and VCM notch filter 416 and which generates a final VCM control signal that controls current to the voice coil 134 of the voice coil motor assembly 120 to rotate the actuator assembly 112.

The compensation signals can be tailored to the response characteristics of the VCM and microactuator portions of the servo control system 400. For example, higher frequency disturbance compensation may be applied to the microactuator because the microactuator is better able to compensate such higher frequency disturbance components. Lower frequency disturbance compensation may be applied to the VCM because the VCM is better able to compensate such lower frequency disturbance components.

Figure 5:
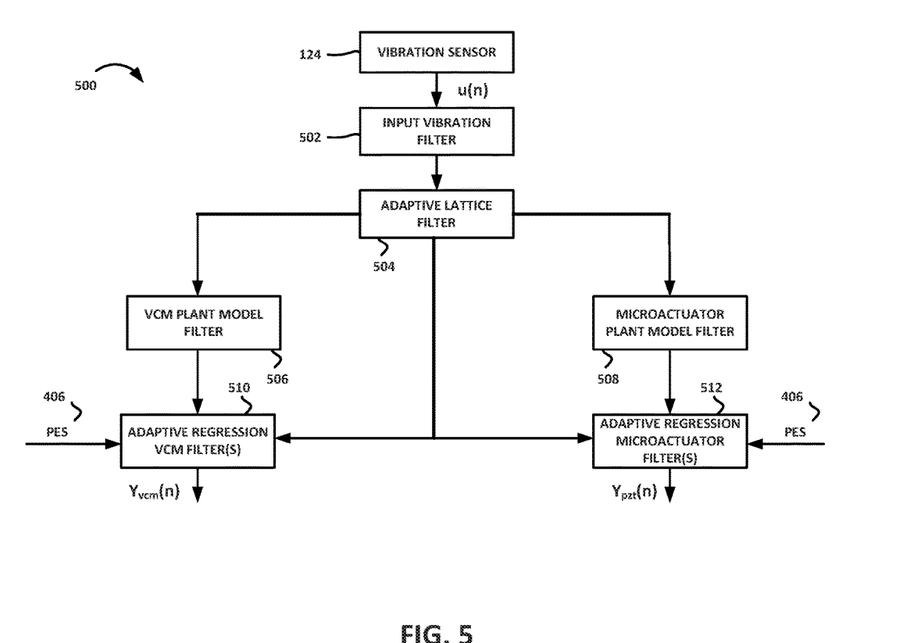
FIG. 5 shows a diagram of a portion of the servo control system shown in FIG. 4.

FIG. 5 provides additional detail on both the microactuator feedforward compensator 412 and VCM feedforward compensator 418, which form a compensation circuit 500. The compensation circuit 500 performs multi-stage least mean squares (LMS) adaptive filtering to generate the VCM and microactuator compensation signals, $Y_{vcm}(n)$ and $Y_{pzt}(n)$. The compensation circuit utilizes an optional input filter 502, an adaptive lattice filter 504, VCM plant model 506, microactuator plant model 508, adaptive regression VCM filter 510, and adaptive regression microactuator filter 512.

In some embodiments, the input filter 502 normalizes the phase of the vibration sensor signal (u(n)) and removes certain undesired disturbances or disturbance components from the vibration sensor signal. The input filter 502 outputs a forward prediction error signal and a backward prediction error signal to a first stage of the N number of stages of the adaptive lattice filter 504. The outputs from the adaptive lattice filter 504 are tap inputs to each of the various stages of the VCM and microactuator regression filters 510, 512, The VCM and microactuator regression filters 510, 512 have N number of lattice regression filter stages corresponding to the N number of lattice filter stages of the adaptive lattice filter 504.

For each lattice filter stage and corresponding lattice regression filter stage, the backward prediction error signal passes through a VCM plant model filter 506 and microactuator plant model filter 508 to adapt coefficients of the VCM and microactuator regression filters 510, 512 jointly with the PES 406. The VCM plant model filter 506 and the microactuator plant model filter 508 function to maintain LMS adaption stability of the servo control system 400.

The VCM and microactuator regression filters 510, 512 are connected to various taps of the adaptive lattice filter 504 to receive orthogonal prediction error signals from each stage. Each successive stage outputs a new set of orthogonal error signals. The signals may be processed through the adaptive lattice filter 504 in accordance with the so-called Gram-Schmidt Orthogonalization procedure whereby the adaptive lattice filter 504 uses reflection coefficients to split the input signal into N sets of orthogonal signals.

Each stage of the VCM and microactuator regression filters 510, 512 receives a separate one of the backward prediction error signals, and applies a regression step to generate respective lattice stage error signals and compensation signals, $Y_{vcm}(n)$ and $Y_{pzt}(n)$. Nominally, the final error signal is driven to zero or a nominal value and the final correction signals, $Y_{vcm}(n)$ and $Y_{pzt}(n)$, are output for injection into VCM or microactuator control signals where the VCM regression filter 510 is injected after the VCM notch filter 416 and the microactuator regression filter 512 is injected before the microactuator notch filter 410.

The Equations presented below describe operation of the servo control system 400. In particular, Equation 9 shows that the microactuator plant model 508 can be described by microactuator components independent from and/or without VCM components. As such, the VCM plant model 506 and microactuator plant model 508 can be designed independently to compensate for certain disturbance components.

$P_v$=VCM plant without notch filter
$P_p$=microactuator plant without notch filter
$N_v$=VCM notch filter
$N_p$=microactuator notch filter
$C_v$=VCM controller
$C_p$=microactuator controller
$d_v$=equivalent input disturbance at VCM input
$d_p$=equivalent input disturbance at microactuator input
OL=overall open loop transfer function
$OL_p$=microactuator open loop function
e=PES Equation 1, showing components of a signal transfer function from $d_v$, $d_p$ to PES:

$$e = -\frac{P_v}{1+OL} \times d_v - \frac{N_p P_p (1+P_v N_v C_v)}{1+OL} \times d_p$$

Equation 2, showing components of the overall open loop transfer function of the servo control system 400:

$$OL = P_p N_p C_p + P_p N_p C_p P_v N_v C_v + P_v N_v C_p.$$

Equation 3, showing components of the decoupled microactuator open loop transfer function of the servo control system 400:

$$OL_p = 1 + P_p N_p C_p$$

Equation 4:

$$1+OL = (1+P_p N_p C_p) \times (1+P_v N_v C_v)$$

Equation 5, where Equation 4 is substituted into Equation 1:

$$e = -\frac{P_v}{1+OL} \times d_v - \frac{N_p P_p (1+P_v N_v C_v)}{(1+P_p N_p C_p) \times (1+P_v N_v C_v)} \times d_p$$

Equation 6, which is a simplification of Equation 5:

$$= -\frac{P_v}{1+OL} \times d_v - \frac{N_p P_p}{1+P_p N_p C_p} \times d_p$$

Equation 7, which is a simplification of Equation 6:

$$= -\frac{P_v}{1+OL} \times d_v - \frac{N_p P_p}{1+OL_p} \times d_p$$

Equation 8, representing components of the VCM plant model 506:

$$-\frac{P_v}{1+OL}$$

Equation 9, representing components of the microactuator plant model 508:

$$-\frac{N_p P_p}{1+OL_p}$$

The various embodiments and components described above may be implemented using firmware, integrated circuits, and/or software modules that interact with each other or are combined together. For example, the control diagrams illustrated herein may be used to create computer-readable instructions/code for execution by a processor. Such instructions may be stored on a non-transitory computer-readable medium and transferred to a processor for execution. In another example, the embodiments and components described above, such as components of the servo control system 400, are implemented in one or more application-specific integrated circuits (ASIC). The structures and procedures shown above are only a representative example of embodiments that can be used to provide the functions described hereinabove.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

What is claimed is:

1. An apparatus comprising:
    a microactuator controller configured to generate a microactuator control signal;
    a feedforward microactuator compensator configured to generate a microactuator compensation signal in response to a position error signal and a vibration sensor signal, wherein the microactuator compensation signal is configured to be injected into the microactuator control signal to generate a modified microactuator control signal; and
    a microactuator model filter configured to filter the modified microactuator control signal to generate a filtered modified microactuator control signal and inject the filtered modified microactuator control signal into the position error signal to generate a modified position error signal.

2. The apparatus of claim 1, further comprising:
    a voice coil motor (VCM) controller, wherein the modified position error signal is injected into the VCM controller.

3. The apparatus of claim 2, wherein the VCM controller is configured to generate a VCM control signal in response to the modified position error signal.

4. The apparatus of claim 3, further comprising:
    a VCM notch filter configured to generate a filtered VCM control signal.

5. The apparatus of claim 4, further comprising:
    a feedforward VCM compensator configured to generate a VCM compensation signal, wherein the VCM compensation signal is injected into the filtered VCM control signal to generate a final VCM control signal.

6. The apparatus of claim 5, wherein the final VCM control signal controls a current applied to a voice coil.

7. The apparatus of claim 1, further comprising:
    a microactuator notch filter configured to filter the modified microactuator control to generate a filtered modified microactuator control signal that controls a voltage applied to the microactuator.

8. The apparatus of claim 1, further comprising:
    a vibration sensor configured to generate the vibration sensor signal.

9. The apparatus of claim 8, wherein the apparatus includes only a single vibration sensor.

10. The apparatus of claim 1, further comprising:
    a compensation circuit including the feedforward microactuator compensator and a voice coil motor (VCM) feedforward microactuator compensator.

11. The apparatus of claim 10, further comprising:
    a VCM regression filter; and
    a microactuator regression filter.

12. The apparatus of claim 11, wherein the VCM regression filter generates a VCM compensation signal, and wherein the microactuator regression filter generates the microactuator compensation signal.

13. The apparatus of claim 11, wherein the compensation circuit includes an adaptive lattice filter that generates tap inputs for the VCM regression filter and the microactuator regression filter.

14. The apparatus of claim 13, wherein the feedforward microactuator compensator includes a microactuator plant model filter, and wherein the feedforward VCM compensator includes a VCM plant model filter.

15. A method comprising:
positioning a read/write head via a voice coil motor (VCM) via a final VCM control signal, wherein the final VCM control signal is generated in response to at least a position error signal, a filtered modified microactuator control signal, a vibration sensor signal, and a feedforward VCM compensation signal; and
positioning the read/write head via a microactuator via a filtered modified microactuator control signal, wherein the filtered modified microactuator control signal is generated in response to the position error signal, the vibration sensor signal, and a feedforward microactuator compensation signal.

16. The method of claim 15, wherein the microactuator compensation signal is generated to compensate for higher frequency components of the vibration sensor signal.

17. The method of claim 15, wherein the VCM compensation signal is generated to compensate for lower frequency components of the vibration sensor signal.

18. An integrated circuit comprising:
means for controlling a position of a read/write head via a voice coil motor (VCM) assembly via a VCM control loop;
means for controlling a position of the read/write head via a microactuator via a microactuator control loop; and
means for decoupling components of the microactuator control loop from components of the VCM control loop.

* * * * *